US012572895B2

(12) United States Patent
Ansar et al.

(10) Patent No.:    US 12,572,895 B2
(45) Date of Patent:       Mar. 10, 2026

(54) SYSTEMS AND METHODS FOR VISUALIZING AND MANAGING PROJECT FLOWS IN A MEGAPROJECT

(71) Applicant: Foresight Works Ltd, London (GB)

(72) Inventors: Atif Ansar, Oxford (GB); Itay Eliaz, Petach Tikva (IL); Edward John Hartshorne, Oxfordshire (GB)

(73) Assignee: Foresight Works Ltd, London (GB)

( * ) Notice: Subject to any disclaimer, the term of this patent is extended or adjusted under 35 U.S.C. 154(b) by 120 days.

(21) Appl. No.: 18/120,324

(22) Filed:      Mar. 10, 2023

(65)            Prior Publication Data

US 2023/0289729 A1      Sep. 14, 2023

Related U.S. Application Data

(60) Provisional application No. 63/318,754, filed on Mar. 10, 2022.

(51) Int. Cl.
| | |
|---|---|
| *G06Q 10/10* | (2023.01) |
| *G06Q 10/0631* | (2023.01) |
| *G06Q 10/0635* | (2023.01) |
| *G06Q 10/101* | (2023.01) |

(52) U.S. Cl.
CPC ... *G06Q 10/103* (2013.01); *G06Q 10/063118* (2013.01); *G06Q 10/0635* (2013.01); *G06Q 10/101* (2013.01)

(58) Field of Classification Search
CPC ......... G06Q 10/103; G06Q 10/063118; G06Q 10/0635; G06Q 10/101
See application file for complete search history.

(56)                  References Cited

U.S. PATENT DOCUMENTS

| | | | | |
|---|---|---|---|---|
| 8,738,414 B1 * | 5/2014 | Nagar | .................. | G06Q 10/103 |
| | | | | 705/7.12 |
| 11,100,470 B2 * | 8/2021 | Defusco | ........... | G06Q 10/06313 |
| 2005/0171790 A1 * | 8/2005 | Blackmon | ............ | G06Q 50/165 |
| | | | | 705/315 |
| 2007/0038494 A1 * | 2/2007 | Kreitzberg | ............. | G06Q 10/10 |
| | | | | 358/1.9 |
| 2016/0055160 A1 * | 2/2016 | Himel | .................. | G06F 16/248 |
| | | | | 707/728 |
| 2022/0156659 A1 * | 5/2022 | Scholar | ............... | G06Q 10/103 |

OTHER PUBLICATIONS

Gallotti, Riccardo, et al., "The Multilayer Temporal Network of Public Transport in Great Britain", Scientific Data 2, 140056 (2015) (Year: 2015).*

* cited by examiner

*Primary Examiner* — Amber A Misiaszek

(57)              ABSTRACT

The present invention pertains to a method for managing a megaproject. Initially, a user file comprising information pertaining to the megaproject is uploaded. Insights related to the megaproject are generated. These insights can include progress, risk, and quality metrics. Potential user activities are prioritized into recommended priorities to achieve efficient results. A personalized workflow is generated.

15 Claims, 10 Drawing Sheets

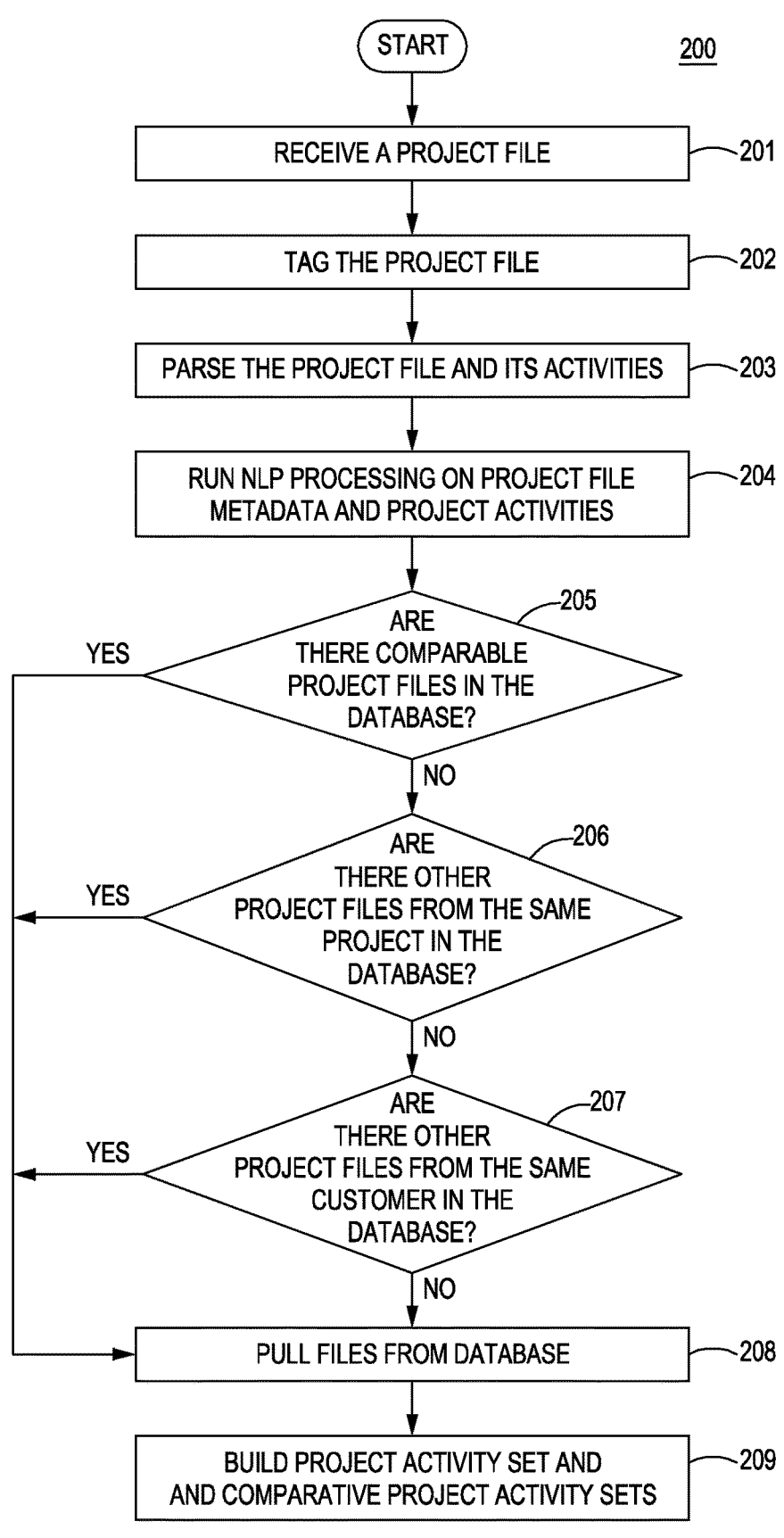

START    200

RECEIVE A PROJECT FILE ⎯201

TAG THE PROJECT FILE ⎯202

PARSE THE PROJECT FILE AND ITS ACTIVITIES ⎯203

RUN NLP PROCESSING ON PROJECT FILE METADATA AND PROJECT ACTIVITIES ⎯204

ARE THERE COMPARABLE PROJECT FILES IN THE DATABASE? ⎯205
YES
NO

ARE THERE OTHER PROJECT FILES FROM THE SAME PROJECT IN THE DATABASE? ⎯206
YES
NO

ARE THERE OTHER PROJECT FILES FROM THE SAME CUSTOMER IN THE DATABASE? ⎯207
YES
NO

PULL FILES FROM DATABASE ⎯208

BUILD PROJECT ACTIVITY SET AND AND COMPARATIVE PROJECT ACTIVITY SETS ⎯209

START

<u>400</u>

SCHEDULE ANALYSIS
PERFORMED                    ～401

IS THE
INSIGHT DIRECTLY
ACTIONABLE?                  ～402

YES → GENERATE 'KC GENERATED'
KANBAN CARD                  ～406

NO

IS THE
INSIGHT ACTIVITY-
SPECIFIC?                    ～403

YES → GENERATE KC COMMENT
IN A 'SCHEDULE ACTIVITY'
KANBAN CARD                  ～405

NO

GENERATE DATA POST IN
THE SOCIAL FEED              ～404

700
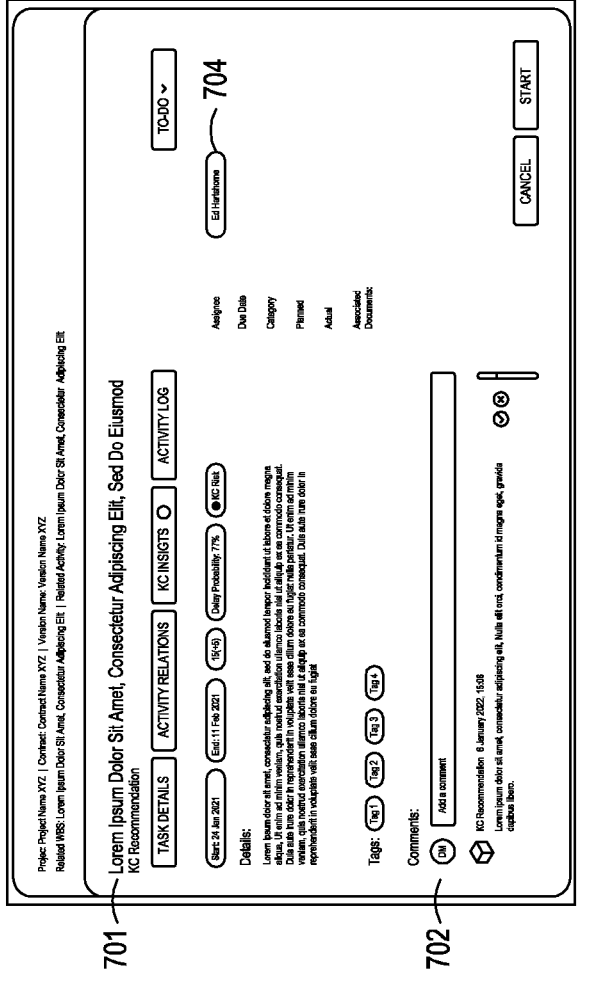
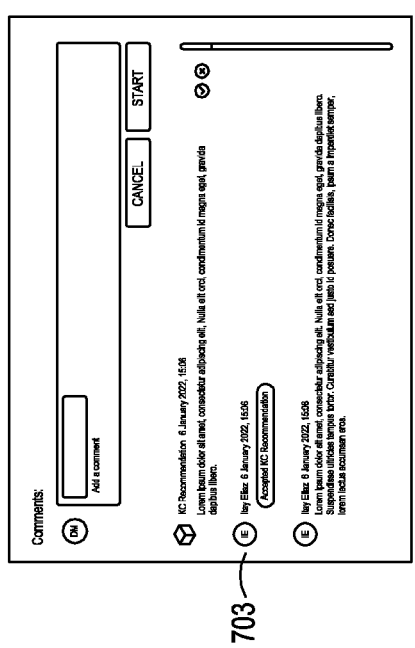
FIGURE 7

800
Project Activity Cards
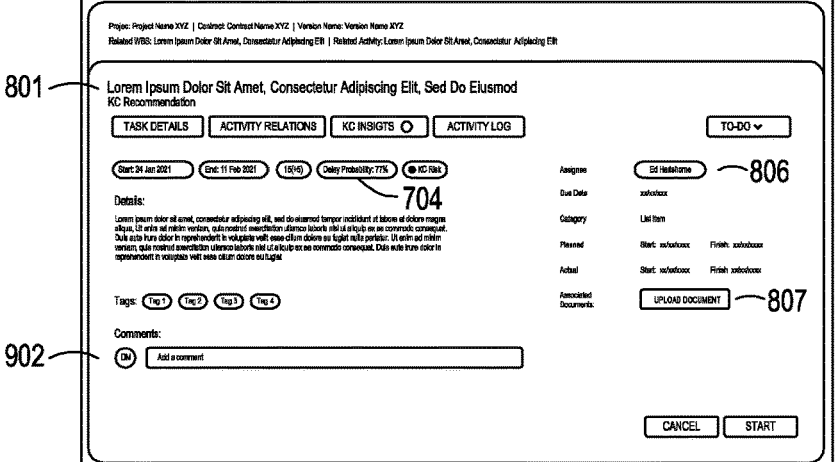
801
704
806
807
902
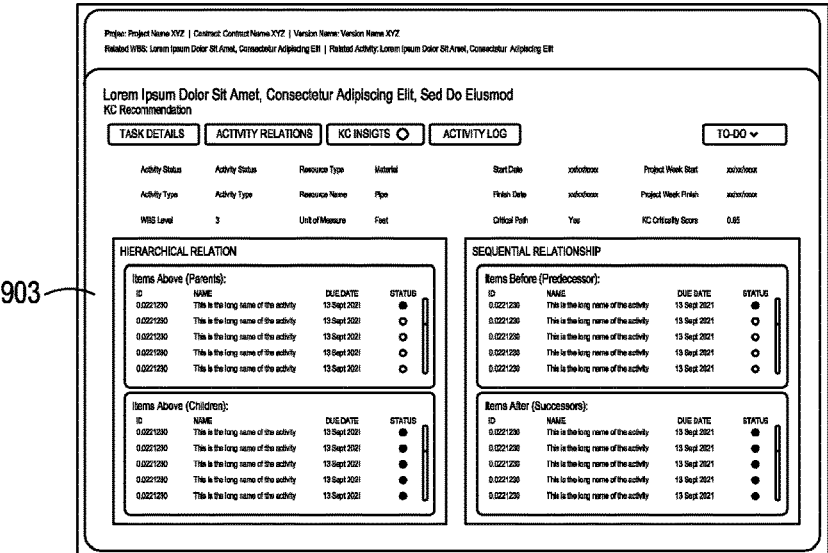
903
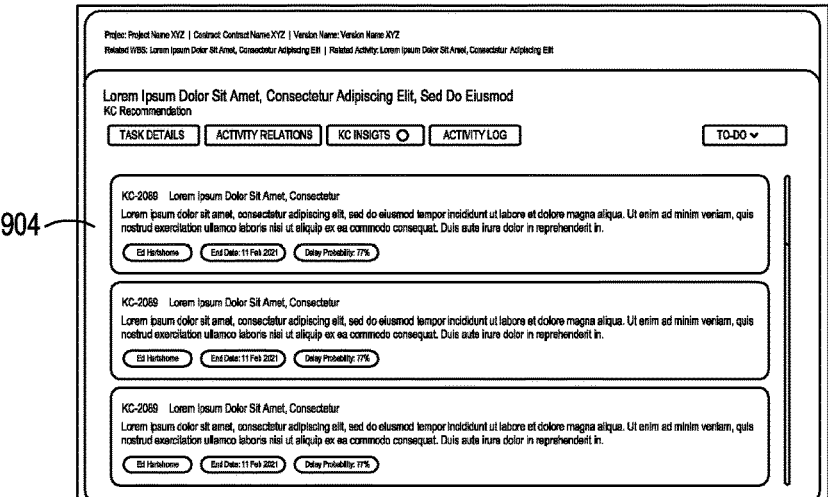
904
FIGURE 8

1000

SYSTEMS AND METHODS FOR VISUALIZING AND MANAGING PROJECT FLOWS IN A MEGAPROJECT

CROSS-REFERENCE TO RELATED APPLICATIONS

This application claims the benefit of and priority to U.S. Provisional Application No. 63/318,754, filed on Mar. 10, 2022, which is hereby incorporated by reference in its entirety.

FIELD OF THE INVENTION

The present invention relates to the field of information processing and project management. More particularly, embodiments in accordance with the present invention are related to systems and methods for visualizing and managing project flows.

BACKGROUND

A megaproject is a large-scale, complex and often expensive project that involves multiple stakeholders, has a significant impact on its surrounding environment, and is characterized by its size, scope, and level of complexity. Examples of megaprojects include large infrastructure projects like high-speed rail systems, airports, seaports, and highways, as well as large construction projects like shopping centers, stadiums, and theme parks. Megaprojects often involve multiple partners, including government agencies, private companies, and other organizations, and require coordination and cooperation among these partners to ensure their successful completion. Because of their size and complexity, megaprojects can also pose significant risks, including cost overruns, delays, and negative impacts on the environment and local communities.

Megaprojects are extremely difficult to manage due to a number of factors. Megaprojects are large, complex endeavors that involve multiple stakeholders, extensive planning, and the coordination of many different activities. This level of complexity makes it challenging to manage all the moving parts and ensure that everything is running smoothly. Megaprojects are usually much larger in scale than traditional projects, which makes it difficult to manage the many resources involved and ensure that everything is progressing as planned. Many megaprojects involve a high degree of uncertainty, such as unexpected changes in the economy, political instability, and fluctuations in resource costs. These uncertainties can make it difficult to manage the project effectively and maintain a clear vision of the end goal. Furthermore, megaprojects often involve many stakeholders with different interests, priorities, and perspectives, which can make it difficult to achieve consensus and resolve conflicts. By their very nature, megaprojects are often very expensive, and cost overruns and delays are common due to the complexity and scale of the projects. These overruns and delays can be difficult to manage and can have a significant impact on the project budget and time. Lastly, megaprojects involve a significant amount of risk, including technical, financial, and legal risks. Managing these risks effectively is essential to the success of the project, but it can be challenging due to the complexity of the project and the difficulty of predicting and mitigating risks.

SUMMARY

Embodiments of the present invention pertain to software for managing a megaproject. The software platform comprises automated reporting and narratives, AI-driven prioritization and recommendations, risk prediction and control, collaboration and workflow, and excellence applications related to managing megaprojects. A user's Primavera P6 or Microsoft Project files are uploaded to a software platform. The software platform then generates insights instantaneously which the team can then act upon. AI calculated views display progress, risk, and quality graphs and a risk look ahead chart. A prioritization engine comprises an AI engine with a prioritization algorithm that sorts thousands of things a user could be doing into focused priorities of what each team needs to be working on in the coming week, month, and quarter to achieve efficient results. A collaboration and personalized workflow is generated. Everything a user needs to know to get it done is shown in one convenient location. It is sequenced and prioritized according to the user's inputs. Users can collaborate, assign, share, comment, tag and track progress across all teams. Users can also invite external parties with role-based access control to focus on specific work. Users can also view their entire portfolio on one screen, risks and bottlenecks included. Lessons learned, issues, and risks from across the portfolio become recommendations and alerts for in-flight projects. The software platform also provides teams with the highest level of insight into their schedule data. The software platform reveals what will happen in the future and suggests what teams should do about it.

These and other objects and advantages of the various embodiments of the invention will be recognized by those of ordinary skill in the art after reading the following detailed description of the embodiments that are illustrated in the various drawing figures.

BRIEF DESCRIPTION OF DRAWINGS

The accompanying drawings, which are incorporated in and form a part of this specification and in which like numerals depict like elements, illustrate embodiments of the present disclosure and, together with the detailed description, serve to explain the principles of the disclosure.

FIG. 2 illustrates a flow chart of an exemplary process for building project activity sets and comparative project activity sets, in accordance with embodiments of the present invention.

FIG. 7 illustrates an exemplary plurality of display representations illustrating graphical user interface elements for displaying schedule information, including action recommendations and user assignments, in accordance with embodiments of the present invention.

FIG. 8 illustrates an exemplary plurality of display representations illustrating graphical user interface elements for displaying project activity cards, in accordance with embodiments of the present invention.

DETAILED DESCRIPTION

Figure 1:
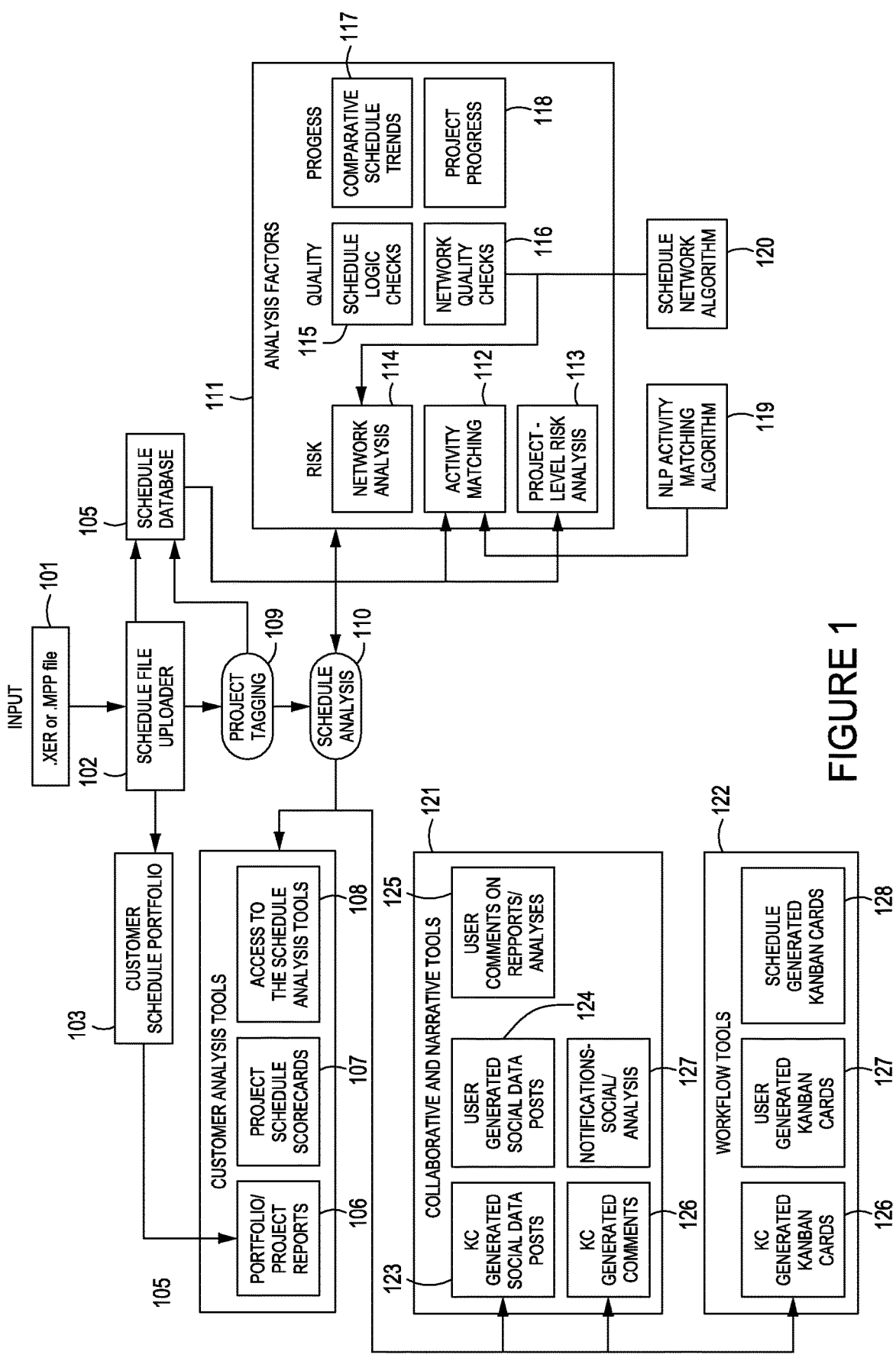
FIG. 1 illustrates a block diagram of an exemplary system for visualizing and managing project flows, in accordance with embodiments of the present invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computing system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "accessing," "allocating," "storing," "receiving," "sending," "writing," "reading," "transmitting," "loading," "pushing," "pulling," "processing," "caching," "routing," "determining," "selecting," "requesting," "synchronizing," "copying," "mapping," "updating," "translating," "generating," "allocating," or the like, refer to actions and processes of an apparatus or computing system (e.g., the methods of FIGS. 7, 8, 9, and 10) or similar electronic computing device, system, or network (e.g., the system of FIG. 2A and its components and elements). A computing system or similar electronic computing device manipulates and transforms data represented as physical (electronic) quantities within memories, registers or other such information storage, transmission or display devices.

Some elements or embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

The meaning of "non-transitory computer-readable medium" should be construed to exclude only those types of transitory computer-readable media which were found to fall outside the scope of patentable subject matter under 35 U.S.C. § 101 in *In re Nuijten,* 500 F.3d 1346, 1356-57 (Fed. Cir. 2007). The use of this term is to be understood to remove only propagating transitory signals per se from the claim scope and does not relinquish rights to all standard computer-readable media that are not only propagating transitory signals per se.

Computer storage media includes volatile and nonvolatile, removable and non-removable media implemented in any method or technology for storage of information such as computer-readable instructions, data structures, program modules, or other data. Computer storage media includes, but is not limited to, processor registers, double data rate (DDR) memory, random access memory (RAM), static RAMs (SRAMs), or dynamic RAMs (DRAMs), read only memory (ROM), electrically erasable programmable ROM (EEPROM), flash memory (e.g., an SSD) or other memory technology, compact disk ROM (CD-ROM), digital versatile disks (DVDs) or other optical storage, magnetic cassettes, magnetic tape, magnetic disk storage or other magnetic storage devices, or any other medium that may be used to store the desired information and that may be accessed to retrieve that information.

Communication media may embody computer-executable instructions, data structures, and/or program modules, and includes any information delivery media. By way of example, and not limitation, communication media includes wired media such as a wired network or direct-wired connection, and wireless media such as acoustic, radio frequency (RF), infrared and other wireless media. Combinations of any of the above may also be included within the scope of computer-readable media.

FIG. 1 illustrates a block diagram of an exemplary system 100 for visualizing and managing project flows, in accordance with embodiments of the present invention. The following are some of the key steps involved in managing a megaproject. Clearly define the goals, objectives, and deliverables of the project, as well as any constraints and risks. Identify the individuals and organizations that will be involved in the project, and put together a project team with the right mix of skills, experience, and expertise. Create a comprehensive project plan that outlines the tasks, timelines, budgets, and resources required for the project, and ensure that all stakeholders are aware of and agree with the plan. Regularly monitor the progress of the project and compare it against the project plan. Make any necessary adjustments to ensure the project stays on track. Good communication is critical to the success of a megaproject. Ensure that all stakeholders are kept informed about the project status, progress, and any changes that may impact them. Identify, assess, and manage risks associated with the project, and put contingency plans in place to minimize their impact if they occur. Ensure that the project stays within budget and that resources are being used effectively. Regularly evaluate the performance of the project and make any necessary improvements. The success of a megaproject ultimately depends on effective leadership, strong project management skills, and the ability to effectively coordinate and collaborate with stakeholders. These steps are embodied in the process flow and block diagram of the megaproject manager as shown in FIG. 1.

The system and process is designed to, a) predict, b) detect, and c) track risks in megaproject construction programs, and related temporary organizations using novel algorithms and data analytics, presenting analyses through novel means, encouraging collaboration through social workflow tools such as action-based kanban cards, and social media-style data analysis posts.

The use of combinatory analytics across multiple present and past megaprojects to provide cross-project insights, and the manner in which these activities are tagged, matched, and analyzed gives the system the novel means of predicting and detecting risks across multiple facets of a megaproject, and across a range of verticals.

Megaprojects are at their core social endeavors, and the direction of key analytics and information towards a means of encouraging action and collaboration in a socialized environment, is both a novelty of the system, but also its primary drive.

Whilst workflow tools such as Kanban cards are ubiquitous across project management, these cards present a novel view of megaproject activities and their relationships as auto-generated action cards, to allow users to easily digest and track upcoming project tasks. A "Kanban card" is a physical or virtual card used in the Kanban method of project management. Kanban is a visual system that helps teams manage and improve their work processes by using a board with cards to represent work items and their current status. Each Kanban card typically represents a task, a work item, or a feature that needs to be completed. The card contains information about the task or item, such as a title, a brief description, and the person responsible for completing it. It may also include other relevant information, such as the due date priority level, or any Mockers that are preventing progress. Kanban cards are moved across the board as work progresses, with each column on the board representing a different stage in the workflow, from "To Do" to "In Progress" to "Done." The movement of the cards helps teams visualize their work and identify areas where they can improve their processes to increase efficiency and productivity.

These are combined with novel algorithms as schedule recommendations presented as a visual representation of a work item, e.g., as "kanban cards," auto-generated from novel ML algorithms and auto-assigned to specific users as trackable and collaborative action cards.

Wider collaborative tools are used to encourage users deeper into the knowledge base of their projects, with a view to increasing work efficiency and the dissemination of unbiased data throughout the group of users.

In one embodiment, an .XER or .MPP file 101 is input to a computer system. The .XER or .MPP file 101 contains the data pertaining to one or more megaprojects. The .XER or .MPP file 101 is then uploaded by schedule file uploader 102 to a customer schedule portfolio 103 and a schedule database 104. The customer schedule portfolio contains data pertaining the desired schedule of a customer. The schedule database 104 tracks the schedule of the megaproject. The process flow from the customer schedule portfolio 103 proceeds to the customer analysis tools 105. These customer analysis tools 105 can include software to help analyze the customer's schedule information, such as a tool for portfolio and/or project reports 106; a tool for project schedule scorecards 107; and tools to access the schedule analysis 108.

Schedule file uploader 102 sends schedule data to the project tagging block 109, which tags the project for use in schedule database 104 and schedule analysis block 110. Schedule analysis block 110 exchanges data with analysis factors block 111. Schedule database 104 inputs schedule data to activity matching block 112 and project level risk analysis block 113 of analysis factors block 111. The analysis factors block 111 comprises risk, quality, and progress processes. The risk process includes activity matching 112, project level risk analysis 113, and network analysis 114. The quality process includes schedule logic checks 115 and network quality checks 116. The progress process includes the comparative schedule trends block 117 and the project progress block 118. A natural language processor activity matching algorithm 119 is used to input NLP data to the activity matching block 112 of the analysis factors 111. Data from a schedule network algorithm 120 is input to the network quality checks block 116 of the analysis factors 111 to determine quality factors. This data is also input to and used by the network analysis block 114 to determine risk factors.

The schedule analysis block 110 also inputs its data to the collaborative and narrative tools block 121 and the workflow tools block 122.

The collaborative and narrative tools 121 comprise five function blocks: Knowledge Center (KC) generated social data posts 123, user generated social data posts 124, user comments on reports/analyses 125, Knowledge Center generated comments 126, and notifications—social/analysis 127. The workflow tools 122 comprise Knowledge Center generated Kanban cards 126, user generated Kanban cards 127, and schedule generated Kanban cards 128.

FIG. 2 illustrates a flow chart of an exemplary process 200 for building project activity sets and comparative project activity sets, in accordance with embodiments of the present invention.

Process 200 builds datasets to create intra-project analytics using past comparable project data, and also customer portfolio project data, in some embodiments. The process starts by receiving a project file 201. The received project file is then tagged 202. The project file and its activities are then parsed 203. Natural language process (NLP) is then run on the project file metadata and project activities 204. A determination is made in step 205 as to whether there are comparable project files in the database. If there is at least one comparable project file that does exist in the database, the flow progresses to step 208. Otherwise, is there is not a comparable project file found in the database, step 206 is executed. In step 206, a determination is made as to whether there are other project files from the same project in the database. If there are other project files from the same project in the database, then the process flow proceeds to step 208. Otherwise, step 207 is performed. In step 207, a determination is made as to whether there are other project files from the same customer in the database. The process flow then proceeds to step 208. The appropriate files are pulled from the database in step 208. In step 209, the project activity set and comparative project activity sets are built.

As project files are added to a database, they are tagged across a number of key metrics and using project metadata. The system is then able to distinguish and group comparable projects to build a dataset for comparative analytics. Once this dataset is built, alongside the original project dataset, novel algorithms can be applied to build and present deep program insights to the user. In one embodiment, an artificial intelligence engine is trained and programmed with a prioritization algorithm. The Knowledge Center sorts thousands of things a user could be doing into focused priorities of what each team needs to be working on in the coming week, month and quarter to achieve speedy results. An AI prioritization algorithm is a type of machine learning algorithm that uses artificial intelligence techniques to prioritize a set of items or tasks based on certain criteria or objectives. The algorithm works by analyzing a set of data related to the items or tasks, such as their importance, urgency, or other characteristics. The algorithm then uses this data to determine the priority order for each item or task. There are various types of AI prioritization algorithms, such as decision trees, neural networks, and reinforcement learning algorithms. These algorithms are applied to prioritize the thousands of tasks associated with managing a megaproject.

The Knowledge Center platform comprises automated reporting and narratives, AI-driven prioritization and recommendations, risk prediction and control, collaboration and workflow, and excellence applications. Using the Knowledge Center entails obtaining a domain and uploading the user's Primavera P6 or Microsoft Project files. The Knowledge Center then generates insights instantaneously which the team can then act upon. AI calculated scorecards display progress, risk, and quality graphs and a risk look ahead chart. AI-prioritized battlecards display Kanban cards related to To Do, In Progress, and Done activities. A priorities Matrix show weekly priorities labeled as Urgent (Do Now/Delegate) and Not Urgent (Do Next/Later). The prioritization engine is an AI engine with a prioritization algorithm that sorts thousands of things a user could be doing into focused priorities of what each team needs to be working on in the coming week, month, and quarter to achieve speedy results. A collaboration and personalized workflow is generated. Each program activity automatically becomes a Knowledge Center battlecard. Everything a user needs to know to get it done is shown in one convenient location. It is sequenced and prioritized according to the user's inputs. Users can collaborate, assign, share, comment, tag and track progress across all teams. Users can also invite external parties with role-based access control to focus on specific work. Users can also view their entire portfolio on one screen, risks and bottlenecks included. The wins are displayed as well as the issues. Lessons learned and risks from across the portfolio become recommendations and alerts for in-flight projects. The Knowledge Center also provides teams with the highest level of insight into their schedule data. The Knowledge Center reveals what will happen in the future and suggests what teams should do about it. In one embodiment, an AI future risk prediction algorithm is comprised of a type of machine learning algorithm that uses artificial intelligence techniques to analyze data and predict the likelihood of future risks or negative events that may occur during construction of the megaproject. These algorithms work by analyzing historical data and identifying patterns or correlations that are indicative of potential risks or negative events in the future. The algorithm learns from the current, past, or other related megaprojects and uses this data as a training set to make the future predictions on the current megaproject management.

Figure 3:
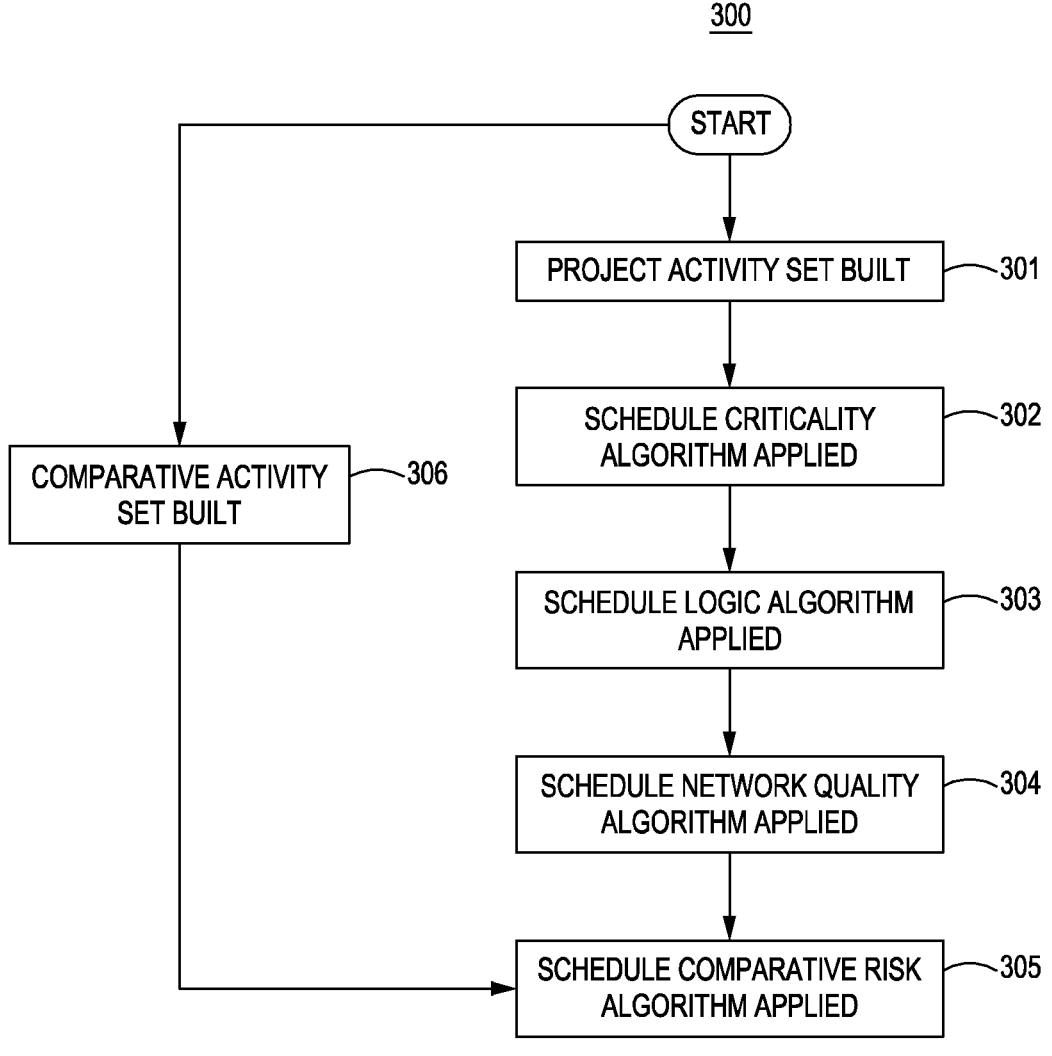
FIG. 3 illustrates a flow chart of an exemplary process 300 for scheduling comparative risk, in accordance with embodiments of the present invention.

FIG. 3 illustrates a flow chart of an exemplary process 300 for scheduling comparative risk, in accordance with embodiments of the present invention. In step 301, the project activity set is built. The schedule criticality algorithm is then applied in step 302. A schedule logic algorithm is applied in step 303. Another algorithm, the schedule network quality algorithm, is applied in step 304. A schedule comparative risk algorithm is applied in step 305. Overall, a comparative activity set is built, step 306.

Once the relevant datasets have been built, a number of novel algorithms are applied, examples of which are illustrated, in some embodiments. These algorithms determine certain risks in the program, using mathematical and logical specifications, and are used in both a composite and singular manner throughout the tool.

Figure 4:
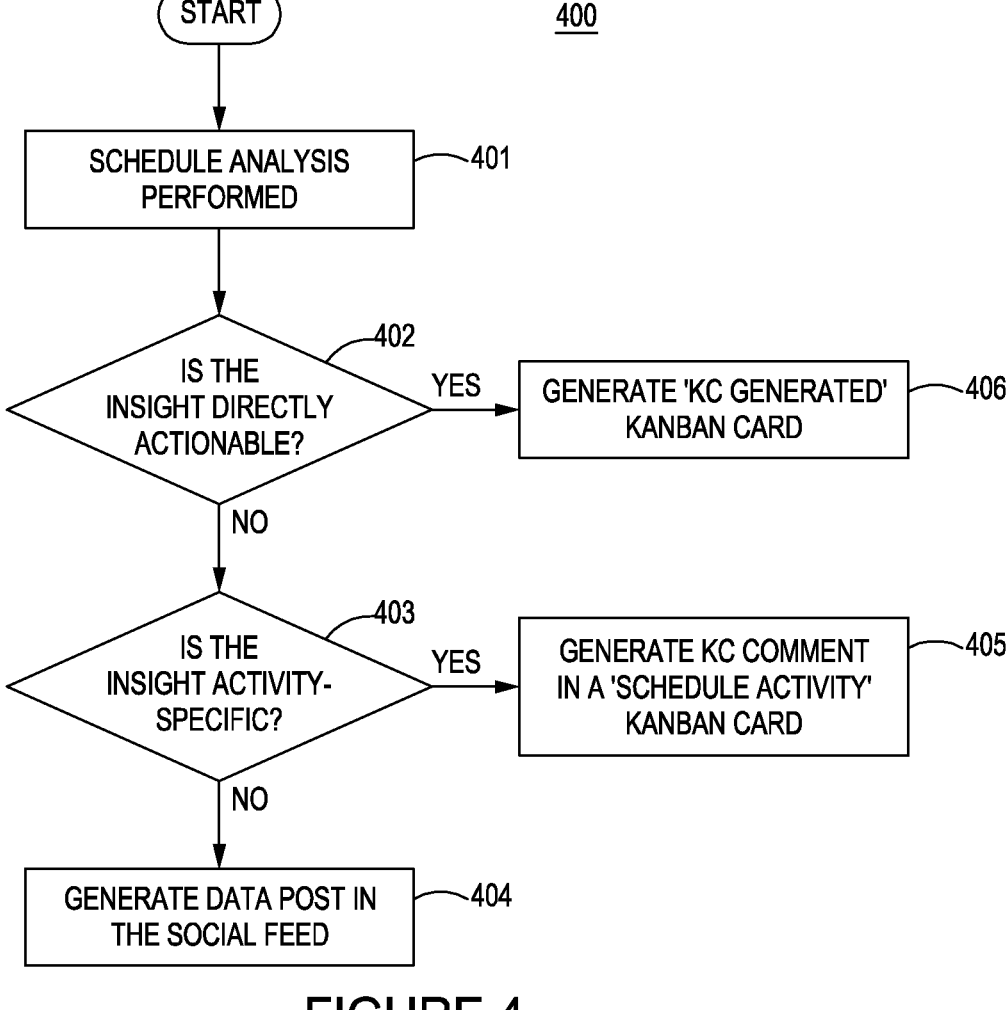
FIG. 4 illustrates a flow chart of an exemplary process 400 for generating a data post in a social media feed, generating a KC comment in a schedule activity kanban card, and/or generating a KC generated kanban card, in accordance with embodiments of the present invention.

FIG. 4 illustrates a flow chart of an exemplary process 400 for generating a data post in a social media feed, generating a KC comment in a schedule activity kanban card, and/or generating a KC generated kanban card, in accordance with embodiments of the present invention. Initially, in step 401, a schedule analysis is performed. Based on the schedule analysis, a determination is made as to whether the insight is directly actionable, step 402. If the insight is directly actionable, the process flow proceeds to step 406. Otherwise, if the insight is not directly actionable, a determination is made as to whether the insight is activity specific, step 403.

Once the system has run the algorithms and determined the analysis to be presented, it is then determined which novel method to present this analysis in.

If the insight produced can be directly and immediately acted upon by a user, it may be presented as an auto-generated trackable action card with a specific recommendation from the system describing means of alleviating the associated risks.

If the insight relates to a specific program activity but is not necessarily directly actionable, it is presented as an auto-generated comment within an action card. The owner of any activity will be alerted to the risk via the comment, and other users can collaboratively work on the issue through the card.

If the insight is not related to a specific program activity, nor is it directly actionable, it can be presented as a data post in a social media-style feed. This insight can then be discussed by users, and presented to stakeholders and other information consumers across the program.

Figure 5:
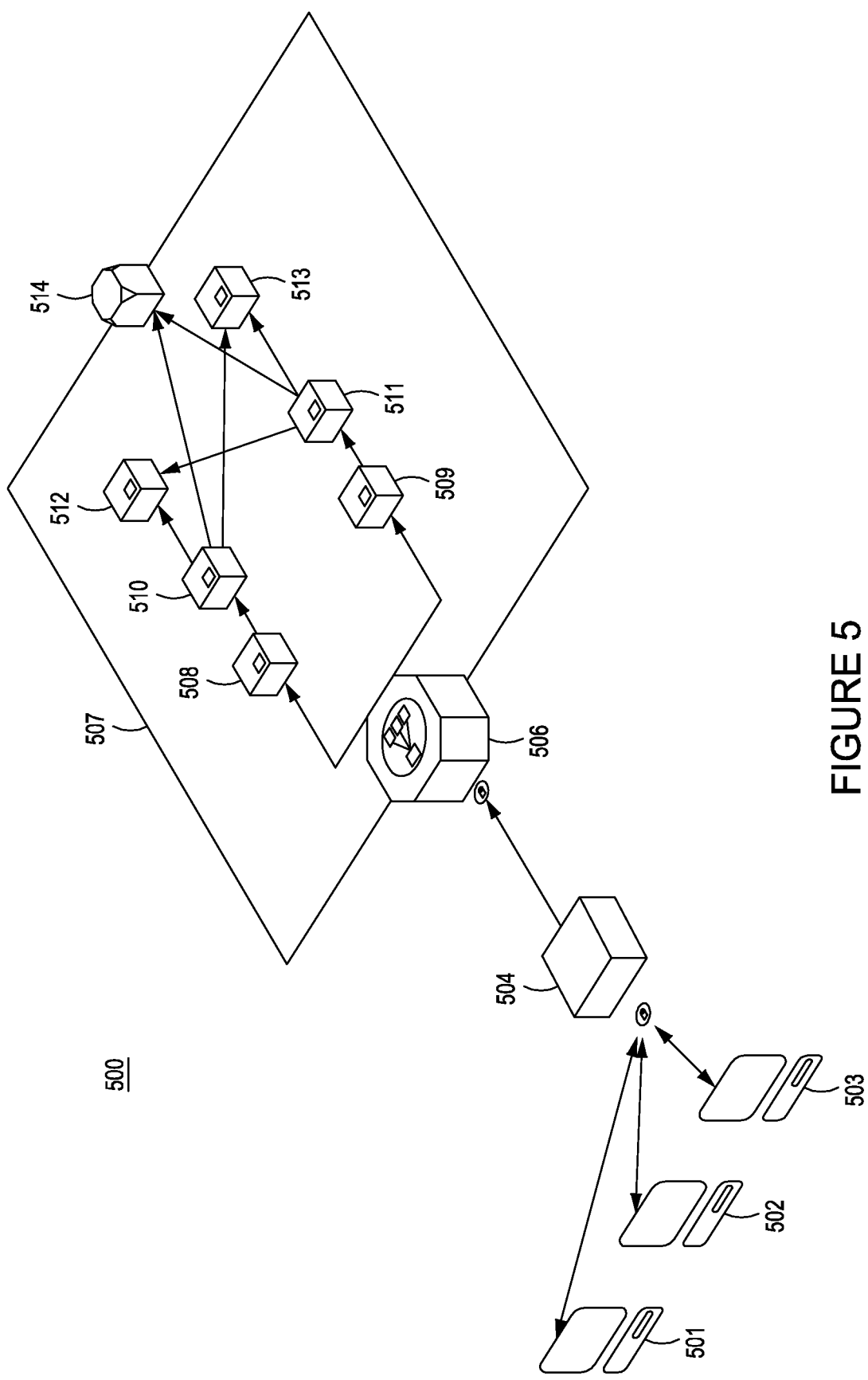
FIG. 5 is an exemplary data flow diagram, in accordance with embodiments of the present invention.

FIG. 5 is an exemplary data flow diagram 500, in accordance with embodiments of the present invention. A set of computers 501-503 access Cloudflare 504, a global network designed to make everything connected to the Internet secure, private, fast, and reliable. Cloudflare 504 is coupled to a load balancer 505, which is part of a virtual private cloud, VPC 507. The VPC 507 is a secure, isolated private cloud hosted within a public cloud. VPC customers can run code, store data, host websites, and do anything else they could do in an ordinary private cloud, but the private cloud is hosted remotely by a public cloud provider. VPC 507 combines the scalability and convenience of public cloud computing with the data isolation of private cloud computing. VPC 507 comprises at least two web servers 508 and 509; two application servers 510 and 511; two artificial intelligence/machine learning servers (AI/ML) 512 and 513; and a relational database service (RDS) database 514.

Figure 6:
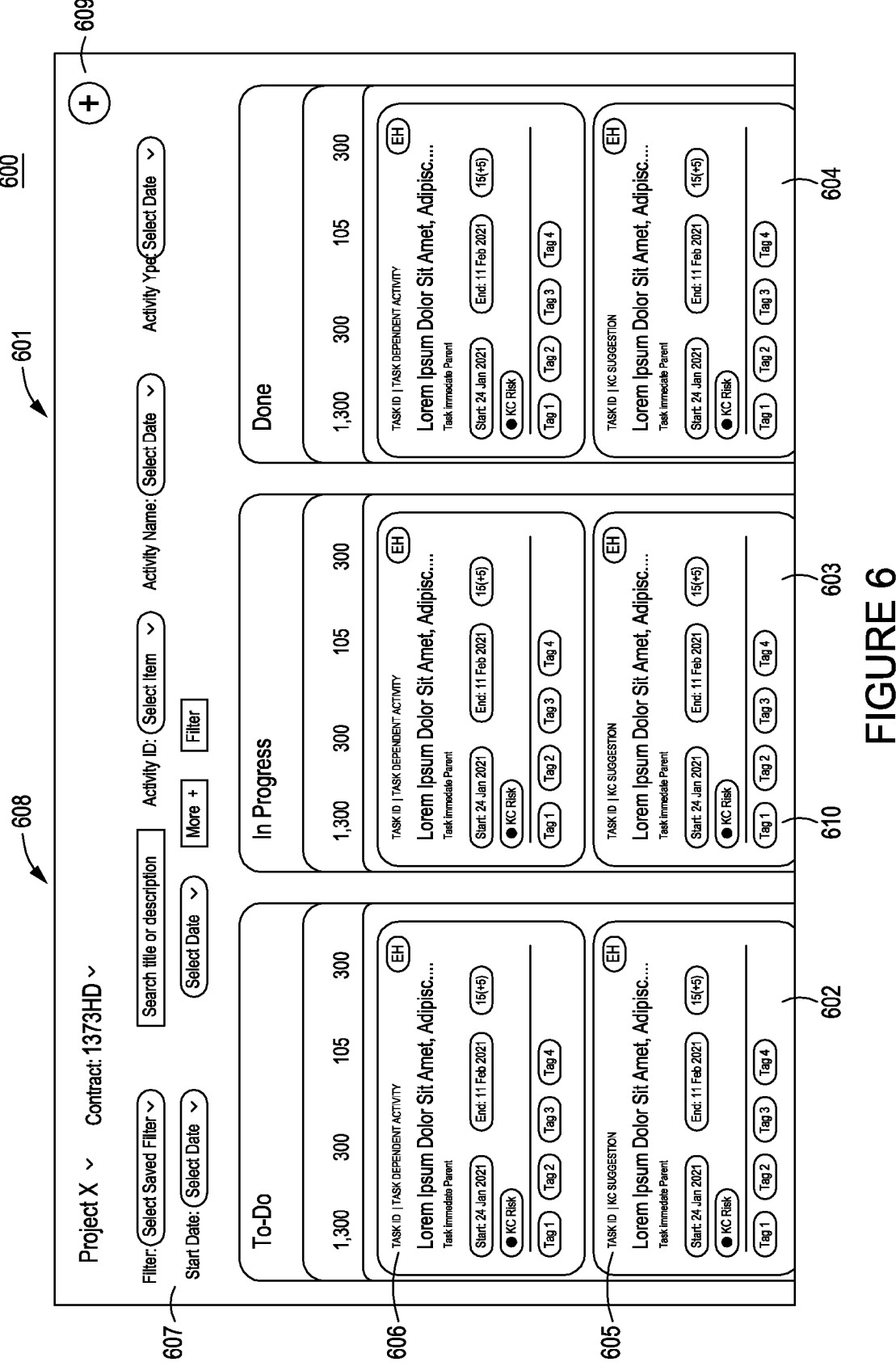
FIG. 6 illustrates an exemplary plurality of display representations illustrating graphical user interface elements for displaying information related to project flows, in accordance with embodiments of the present invention.

FIG. 6 illustrates an exemplary plurality of display representations 600 illustrating graphical user interface elements for displaying information related to project flows, in accordance with embodiments of the present invention. An exemplary Knowledge Center board 601 is shown. A "Kanban hoard is a visual tool used in the Kanban method of project management to represent work items and their current status. The board typically consists of a physical or digital surface with columns and cards representing different stages of the workflow. The columns on a Kanban board can vary depending on the specific needs of a team, but typically include at least three columns: "To Do," "In Progress," and "Done." The cards on the board represent the work items that need to be completed, and each card contains relevant information such as the title, description, due date, and the person responsible for the task. As work progresses, cards are moved across the board from one column to the next. For example, a card may start in the "To Do" column 602 and move to the "In Progress" column 603 when work begins, and then to the "Done" column 604 when the task is completed. This visual representation of work helps teams better understand their workflow and identify areas for improvement to increase efficiency and productivity. Kanban boards can be created using software tools, such as Trello or Asana.

In particular, Knowledge Center generated suggestion cards 605 comprise action items based on Knowledge Center algorithms. Project activity cards 606 can be used to collaborate on project activities. In one embodiment, users will see pre-filtered cards that are relevant to them and their roles 607. Users can also filter cards across a wide range of attributes, allowing them to use the cards in a range of scenarios, such as daily project update meetings, regular stakeholder meetings, etc. 608. Users can create their own cards to capture workflow meeting action items or action items they feel would benefit the project and assign them to the correct user 609. Colors are used to highlight potential risks and issues, such as a card not being moved at the times it should have been, according to plans 610. In one embodiment, the top portion of the Kanban board includes menus such as a filter option, start date, end date, search field, activity ID, activity name, and activity type.

FIG. 7 illustrates an exemplary plurality of display representations 700 illustrating graphical user interface elements for displaying schedule information, including action recommendations and user assignments, in accordance with embodiments of the present invention. The schedule quality/risk/progress issue(s) to be resolved is shown in 701. The action item/recommendation based on schedule analyses to resolve this issue is shown as 702. Users can accept or decline Knowledge Center suggestions based on whether they feel they are useful or not, 703. The card is auto-assigned to the most relevant user, but can be reassigned by them, if needed, 704.

In one embodiment, the top of the graphical user interface includes information related to the project, the contract, the version name, the related work breakdown structure (WBS), and the related activity. Users may click on buttons to traverse to a different page, such as Task Details, Activity Relations, KC Insights, and Activity Log. The Start Time, End Time, number of comments, Delay Probability, and KC Risk data are also display for view.

FIG. 8 illustrates an exemplary plurality of display representations 800 illustrating graphical user interface elements for displaying project activity cards, in accordance with embodiments of the present invention. Display representations 800 illustrate a variety of information generated and/or provided in project activity cards, including social collaboration among teams, activity relationships among a variety of parties, KC recommendations, contact information for responsible parties, and/or supplemental information about a variety of activities, in accordance with embodiments of the present invention.

In one embodiment, information is taken from the project schedule .xer/.mpp files, as shown by 801. Comments allow for social collaboration between teams. Information transfer about an activity is held within that activity's card, 802. Highlighting the activity relationships within the schedule network assists with highlighting blockers to an activity, and the potential activities that could be blocked by this one, 803. A list of KC Recommendation cards that are related to the program activity are displayed to the user, 804. The action items found in the analysis that would improve performance of this activity are consolidated to include all other activities that have this same issue, 804. Activity delay probabilities based on the Activity Matching algorithms are displayed, 805. In 806, responsible people who can be contacted if problems arise are displayed. Supplementary information about the activity is also held within the activity's card, 807. Documentation can be uploaded by users to support the completion of the activity.

Figure 9:
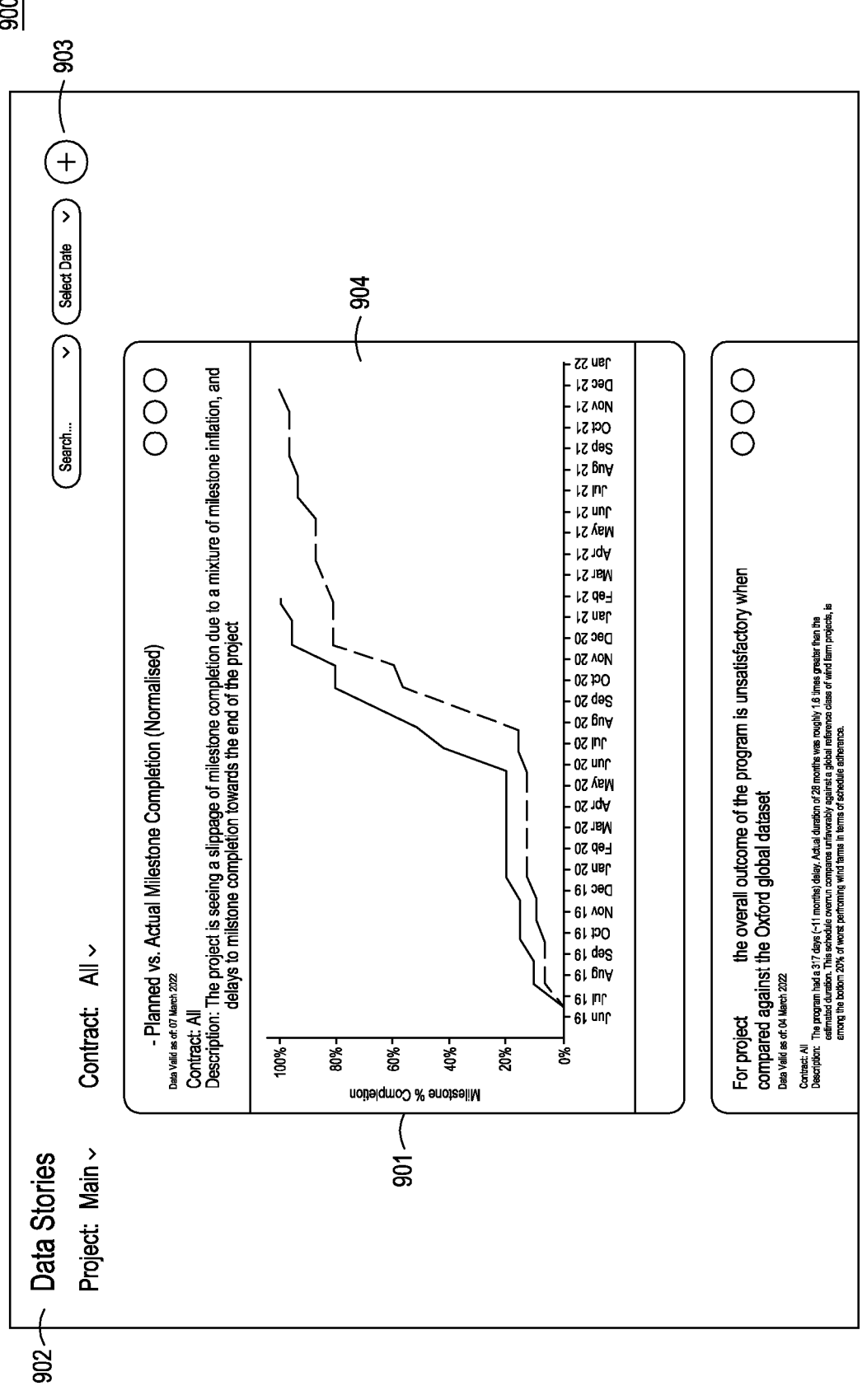
FIG. 9 illustrates an exemplary display representation illustrating graphical user interface elements for displaying planned versus actual milestone completions, in accordance with embodiments of the present invention.

FIG. 9 illustrates an exemplary display representation 900 illustrating graphical user interface elements for displaying planned versus actual milestone completions, in accordance with embodiments of the present invention. The information is presented in a graphical representation whereby the X-axis represents time passage, and the Y-axis represents milestone complete percentage. One graph charts the actual milestone completion as a function of time passing and the other graph charts the planned completion as a function of time passing. One can quickly glance at this chart to see the past, present, and future delays (or completions ahead of schedule). In one embodiment, interactive and collaborative data posts can be used to present non-actionable or general analysis of the project or portfolio, 901. Data Stories and Posts present analyses in easy-to-digest "social media" style posts, allowing for discussion on certain aspects of the project, 902. Users can add their own data stories linking to analyses from throughout the tool to highlight specific information to their colleagues for discussion, 903. These can also be used to present stakeholder reports in an interactive and detailed manner, with all the data coming directly from the central database rather than having to manually collate the data, as shown by 904.

Figure 10:
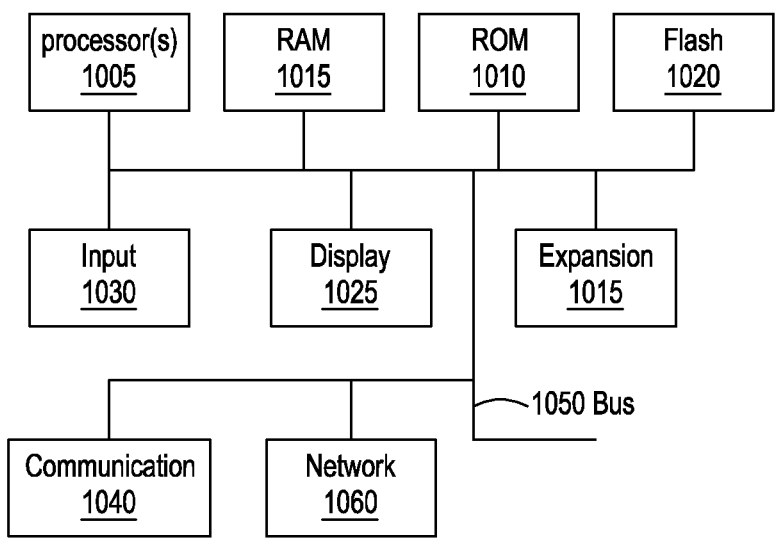
FIG. 10 illustrates a block diagram of an exemplary electronic system, which may be used as a platform for embodiments of the present invention.

FIG. 10 illustrates a block diagram of an exemplary electronic system 1000, which may be used as a platform for embodiments of the present invention.

Electronic system 1000 may be a hand-held, e.g., a "smart" phone, tablet, portable, or "server" computer system, in some embodiments. Electronic system 1000 includes an address/data bus 1050 for communicating information, a central processor complex 1005 functionally coupled with the bus for processing information and instructions. Bus 1050 may comprise, for example, a Peripheral Component Interconnect Express (PCIe) computer expansion bus, industry standard architecture (ISA), extended ISA (EISA), MicroChannel, Multibus, IEEE 796, IEEE 1196, IEEE 1496, PCI, Computer Automated Measurement and Control (CAMAC), MBus, Runway bus, Compute Express Link (CXL), and the like.

Central processor complex 1005 may comprise a single processor or multiple processors, e.g., a multi-core processor, or multiple separate processors, in some embodiments. Central processor complex 1005 may comprise various types of well-known processors in any combination, including, for example, digital signal processors (DSP), graphics processors (GPU), complex instruction set (CISC) processors, reduced instruction set (RISC) processors, and/or very long word instruction set (VLIW) processors. In some embodiments, exemplary central processor complex 1005 may comprise a finite state machine, for example, realized in one or more field programmable gate array(s) (FPGA), which may operate in conjunction with and/or replace other types of processors to control embodiments in accordance with the present invention.

Electronic system 1000 may also include a volatile memory 1015 (e.g., random access memory RAM) coupled with the bus 1050 for storing information and instructions for the central processor complex 1005, and a non-volatile memory 1010 (e.g., read only memory ROM) coupled with the bus 1050 for storing static information and instructions for the processor complex 1005. Electronic system 1000 also optionally includes a changeable, non-volatile memory 1020 (e.g., NOR flash) for storing information and instructions for the central processor complex 1005 which can be updated after the manufacture of system 1000. In some embodiments, only one of ROM 1010 and/or Flash 1020 may be present.

Also included in electronic system 1000 of FIG. 10 is an optional input device 1030. Input device 1030 can communicate information and command selections to the processor complex 1005. Input device 1030 may be any suitable device for communicating information and/or commands to the electronic system 1000. For example, input device 1030 may take the form of a keyboard, buttons, a joystick, a track ball, an audio transducer, e.g., a microphone, a touch sensitive digitizer panel, eyeball scanner, and/or the like.

Electronic system 1000 may comprise a display unit 1025. Display unit 1025 may comprise a liquid crystal display (LCD) device, cathode ray tube (CRT), field emission device (FED, also called flat panel CRT), light emitting diode (LED), plasma display device, electro-luminescent display, electronic paper, electronic ink (e-ink) or other display device suitable for creating graphic images and/or alphanumeric characters recognizable to the user. Display unit 1025 may have an associated lighting device, in some embodiments.

Electronic system 1000 also optionally includes an expansion interface 1035 coupled with the bus 1050. Expansion interface 1035 can implement many well known standard expansion interfaces, including without limitation the Secure Digital Card interface, universal serial bus (USB) interface, Compact Flash, Personal Computer (PC) Card interface, CardBus, Peripheral Component Interconnect (PCI) interface, Peripheral Component Interconnect Express (PCI Express), mini-PCI interface, IEEE 1394, Small Computer System Interface (SCSI), Personal Computer Memory Card International Association (PCMCIA) interface, Industry Standard Architecture (ISA) interface, RS-232 interface, and/or the like. In some embodiments of the present invention, expansion interface 1035 may comprise signals substantially compliant with the signals of bus 1050.

A wide variety of well-known devices may be attached to electronic system 1000 via the bus 1050 and/or expansion interface 1035. Examples of such devices include without limitation rotating magnetic memory devices, flash memory devices, digital cameras, wireless communication modules, digital audio players, and Global Positioning System (GPS) devices.

System 1000 also optionally includes a communication port 1040. Communication port 1040 may be implemented as part of expansion interface 1035. When implemented as a separate interface, communication port 1040 may typically be used to exchange information with other devices via communication-oriented data transfer protocols. Examples of communication ports include without limitation RS-232 ports, universal asynchronous receiver transmitters (UARTs), USB ports, infrared light transceivers, ethernet ports, IEEE 1394, and/or synchronous ports.

System 1000 optionally includes a network interface 1060, which may implement a wired or wireless network interface, for example, mobile and/or cellular data and/or telephony, "WiFi" and/or IEEE 802.11 interfaces. Electronic system 1000 may comprise additional software and/or hardware features (not shown) in some embodiments.

Various modules of system 1000 may access computer readable media, and the term is known or understood to include removable media, for example, Secure Digital ("SD") cards, CD and/or DVD ROMs, diskettes and the like, as well as non-removable or internal media, for example, hard drives, solid state drive s (SSD), RAM, ROM, flash, and the like.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of configurations. In addition, any disclosure of components contained within other components should be considered as examples because many other architecture may be implemented to achieve the same functionality.

Although the subject matter has been described in language specific to structural features and/or methodological acts, it is to be understood that the subject matter defined in this disclosure is not necessarily limited to the specific features or acts described above. Rather, the specific features and acts described above are disclosed as example forms of implementing this disclosure.

Embodiments according to the invention are thus described. While the present invention has been described in particular embodiments, the invention should not be construed as limited by such embodiments, but rather construed according to the following claims.

What is claimed is:

1. A computer implemented method for managing a megaproject, executed by a project management system comprising at least one processor and a non-transitory memory, and at least one artificial intelligence (AI) server coupled to a project schedule database, comprising:

uploading a user file comprising information pertaining to the megaproject, wherein the project schedule database stores the uploaded file and applies a tagging block to generate metadata identifiers for project activities, and wherein the user file is automatically parsed into structured data for further processing;

processing the user file using an AI megaproject model trained on historical megaproject datasets to extract and analyze project parameters, wherein the training of the AI megaproject model comprises receiving a plurality of historical megaproject files, parsing the historical files into structured datasets, extracting project features including risk, progress, and quality metrics, iteratively adjusting model parameters based on prediction accuracy, and storing the trained AI megaproject model in the non-transitory memory for runtime application to new user files;

generating insights related to the megaproject by processing the information using machine learning to perform combinatory analytics across multiple present and past megaprojects, wherein the insights comprise progress, risk, and quality datasets, and wherein the combinatory analytics include automated correlation across project datasets stored in the project schedule database;

prioritizing a plurality of potential user activities into recommended priorities to achieve efficient results by using an artificial intelligence prioritization engine, wherein the prioritization engine applies the AI megaproject model to sequence activities;

generating a personalized workflow sequenced according to AI driven prioritization of user activities and dynamically updated as new data is input from the project schedule database;

generating and displaying a plurality of action-based cards to provide a visual representation of a task or work item to track progress and manage workflow, wherein the cards are generated from the AI megaproject model and stored as digital objects in the project schedule database, the cards comprising metadata comprising task, responsibility assignment, and recommended action items.

2. A computer implemented method for managing a megaproject, executed by a project management system comprising at least one processor and a non-transitory memory, and at least one AI server coupled to a project schedule database comprising:

uploading a user file comprising information pertaining to the megaproject, the project schedule database storing the file and applying a tagging block to generate metadata identifiers for project activities;

processing the user file using a trained artificial intelligence (AI) model to extract and analyze project parameters, wherein the AI model is trained on historical megaproject data, the training comprising receiving a plurality of historical project files, extracting project features including risk, progress, and quality metrics, iteratively adjusting model parameters based on prediction accuracy, and storing a trained AI megaproject model in the memory for application to new project files;

generating insights related to the megaproject by processing the information using machine learning to perform combinatory analytics across multiple present and past megaprojects, wherein the insights comprise progress, risk, and quality displays and wherein the combinatory analytics include database correlation across project datasets stored in the project schedule database;

prioritizing a plurality of potential user activities into recommended priorities by using an artificial intelligence prioritization engine and updates priorities when new project data is ingested;

generating a personalized workflow, wherein users collaborate through social workflow tools and social media-style data analysis posts, the personalized workflow is stored as a set of digital workflow objects in the project schedule database;

enabling collaborative interaction through a graphical user interface by allowing users to post comments, assign tasks, and update task status in real time across distributed computing devices coupled via a network interface.

3. A computer implemented method for managing a megaproject, executed by a project management system comprising at least one processor and a non-transitory memory, comprising:

uploading a user file comprising information pertaining to the megaproject, wherein the project schedule database automatically stores the uploaded file and applies a tagging block to generate metadata identifiers for project activities;

processing the user file using a trained artificial intelligence (AI) model to extract and analyze project parameters, wherein the AI model is trained on historical megaproject data, the training comprising receiving a plurality of historical megaproject files, parsing the historical files into structured datasets, extracting project features including risk, progress, and quality metrics, iteratively adjusting model parameters based on prediction accuracy, and storing the trained AI model in the non-transitory memory for runtime application to new user files;

generating insights related to the megaproject by processing the information using machine learning to perform combinatory analytics across multiple present and past megaprojects, wherein the insights comprise progress, risk, and quality displays;

prioritizing a plurality of potential user activities into recommended priorities to achieve efficient results by using an artificial intelligence prioritization engine, wherein the prioritization engine applies a trained AI ranking model to sequence activities into ordered categories and dynamically updates the priorities in response to newly ingested project data;

generating a personalized workflow sequenced according to the AI-driven prioritization and stored as digital workflow objects in the project schedule database;

generating a project activity graphical user interface used to collaborate on project activities, wherein the project activity is generated from the AI model analysis and stored as digital objects that are displayed on the graphical user interface to enable collaborative editing, commenting, and updating across distributed computing devices in a network.

4. A computer implemented method for managing a megaproject, executed by a project management system comprising at least one processor and a non-transitory memory, comprising:

uploading a user file comprising information pertaining to the megaproject;

processing the user file using a trained artificial intelligence (AI) model to extract and analyze project parameters, wherein the AI model is trained on historical megaproject data;

generating insights related to the megaproject by processing the information using machine learning to perform combinatory analytics across multiple present and past megaprojects, wherein the insights comprise progress, risk, and quality displays;

prioritizing a plurality of potential user activities into recommended priorities to achieve efficient results by using an artificial intelligence prioritization engine;

generating a personalized workflow;

generating suggestion cards with recommended action items.

5. The computer implemented method for managing a megaproject of claim 4 further comprising, generating user created cards corresponding to workflow meeting action items, wherein the user created cards are assigned to a particular user.

6. The computer implemented method of claim 1 for managing a megaproject, executed by a project management system comprising at least one processor and a non-transitory memory further comprising:

generating a display of issues, risks, and bottlenecks associated with the megaproject with recommendations and alerts.

7. The computer implemented method of claim 2 for managing a megaproject, executed by a project management system comprising at least one processor and a non-transitory memory further comprising a user interface for inviting one or more external parties to participate on a specific work pertaining to the megaproject.

8. The computer implemented method of claim 4 for managing a megaproject, executed by a project management system comprising at least one processor and a non-transitory memory further comprising:

generating insights into schedule data associated with the megaproject.

9. The computer implemented method of claim 4 for managing a megaproject, executed by a project management system comprising at least one processor and a non-transitory memory further comprising:

displaying schedule data with future schedules and suggestions for improving future schedules.

10. The computer implemented method of claim 4 for managing a megaproject, executed by a project management system comprising at least one processor and a non-transitory memory wherein the risk is comprised of an artificial intelligence algorithm for processing future risk predictions.

11. The computer implemented method of claim 4 for managing a megaproject, executed by a project management system comprising at least one processor and a non-transitory memory wherein the future risk predictions are displayed as a risk look ahead chart.

12. The computer implemented method of claim 5 for managing a megaproject, executed by a project management system comprising at least one processor and a non-transitory memory, wherein the prioritization of the plurality of potential user activities is processed according to an artificial intelligence algorithm.

13. A project management system comprising:

a memory for storing data pertaining to a megaproject;

a processor coupled to the memory for:

processing the data pertaining to the megaproject using a trained artificial intelligence (AI) model to extract and analyze project parameters, wherein the AI model is trained on historical megaproject data, the training comprising receiving a plurality of historical megaproject files, parsing the historical files into structured datasets, extracting project parameters, iteratively adjusting model parameters based on prediction accuracy, and storing the trained AI model in the memory for application to new megaproject data;

generating insights related to the megaproject by processing the data pertaining to the megaproject using machine learning to perform combinatory analytics across multiple present and past megaprojects, wherein the insights comprise progress, risk, and quality displays, and wherein the combinatory analytics include automated correlation across project datasets stored in a project schedule database coupled to the processor;

prioritizing a plurality of potential user activities into recommended priorities by using an artificial intelligence prioritization engine, wherein the prioritization engine executes a trained ranking model to sequence activities into ordered categories and dynamically updates the priorities in response to newly ingested project data;

generating a workflow, wherein the workflow is automatically sequenced according to the AI-driven prioritization and stored as digital workflow objects in the memory;

generating and displaying a plurality of action-based displays to provide a visual representation of a task or work item to track progress and manage workflow and wherein updates to the displays are propagated across distributed computing devices across a network.

14. A project management system comprising:

a memory for storing data pertaining to a megaproject;

a processor coupled to the memory for:

processing the data pertaining to the megaproject using a trained artificial intelligence (AI) model to extract and analyze project parameters, wherein the AI model is trained on historical megaproject data, the training including constructing comparative datasets from a plurality of prior megaproject records, identifying patterns associated with project risks, progress, and quality metrics, refining internal model weights through repeated evaluation cycles, and maintaining the resulting trained model in the memory for use with subsequently uploaded project data;

generating insights related to the megaproject by processing the data pertaining to the megaproject using machine learning to perform combinatory analytics across multiple present and past megaprojects, wherein the insights comprise progress, risk, and quality displays, and wherein the combinatory analytics are performed by executing database-driven joins and pattern-matching across stored project datasets to surface cross-project correlations;

prioritizing a plurality of potential user activities into recommended priorities by using an artificial intelligence prioritization engine, wherein the prioritization engine applies learned ranking criteria derived from the AI model to produce tiered groupings of project activities and updates such groupings automatically when new schedule information is stored in the memory;

generating project activity display that is used to collaborate on project activities, wherein the project activity display comprises a graphical workspace generated by the processor, the workspace comprising multiple interactive project activity objects comprising metadata fields for tasks, assigned personnel, and system-generated recommendations, and wherein the processor synchronizes modifications to the project activity display across multiple client devices coupled to the system.

15. The project management system of claim 14, wherein the processor generates suggestions with recommended action items.

* * * * *